US010629996B2

(12) United States Patent
Hurzon

(10) Patent No.: US 10,629,996 B2
(45) Date of Patent: Apr. 21, 2020

(54) ACTIVE CHAFF

(71) Applicant: VORBECK MATERIALS CORP., Jessup, MD (US)

(72) Inventor: Larry Hurzon, Alexandria, VA (US)

(*) Notice: Subject to any disclaimer, the term of this patent is extended or adjusted under 35 U.S.C. 154(b) by 429 days.

(21) Appl. No.: 15/536,979

(22) PCT Filed: Oct. 16, 2015

(86) PCT No.: PCT/US2015/055909
§ 371 (c)(1),
(2) Date: Jul. 17, 2017

(87) PCT Pub. No.: WO2016/109001
PCT Pub. Date: Jul. 7, 2016

(65) Prior Publication Data
US 2017/0352963 A1 Dec. 7, 2017

Related U.S. Application Data

(60) Provisional application No. 62/064,974, filed on Oct. 16, 2014.

(51) Int. Cl.
*G01S 7/38* (2006.01)
*H01Q 15/14* (2006.01)
*F42B 12/70* (2006.01)
*F41J 2/00* (2006.01)

(52) U.S. Cl.
CPC .............. *H01Q 15/145* (2013.01); *F41J 2/00* (2013.01); *F42B 12/70* (2013.01); *G01S 7/38* (2013.01)

(58) Field of Classification Search
CPC .... F41J 2/00; F42B 12/70; G01S 7/38; H01Q 15/145
USPC ............................................................ 342/12
See application file for complete search history.

(56) References Cited

U.S. PATENT DOCUMENTS

| | | | | |
|---|---|---|---|---|
| 4,546,356 A * | 10/1985 | Petitjean | ................. | G01S 13/24 342/16 |
| 5,136,295 A * | 8/1992 | Bull | .......................... | G01S 7/38 342/15 |
| 5,651,512 A * | 7/1997 | Sand | ....................... | F41G 7/303 244/3.11 |
| 6,369,772 B1 * | 4/2002 | Forster | ...................... | G01S 7/38 343/850 |
| 6,980,152 B2 * | 12/2005 | Steadman | ............... | F41H 11/02 342/14 |
| 2008/0143579 A1 * | 6/2008 | Saccomanno | ........ | H01Q 15/145 342/12 |

(Continued)

*Primary Examiner* — Timothy X Pham
(74) *Attorney, Agent, or Firm* — Trentice V. Bolar, Esq.

(57) ABSTRACT

Embodiments of the present invention relate to a chaff electronic countermeasure device for protecting mobile platforms against radio frequency threats. A device comprises an antenna that is in communication with a substrate. An integrated circuit is in electrical communication with the antenna. The device is configured to absorb from a source a first radio frequency having a first amplitude. In response to absorbing the first radio frequency, the device reradiates at least a portion of a second radio frequency having a second amplitude toward the radar source, which results in an increased radar cross section of the device as perceived by the radar source. The second amplitude is higher than the first amplitude.

18 Claims, 5 Drawing Sheets

(56) References Cited

U.S. PATENT DOCUMENTS

2008/0198060 A1* 8/2008 Shani .................. G01S 7/021
  342/14
2011/0068223 A1* 3/2011 Zahavi .................. F41G 7/224
  244/1 TD

* cited by examiner

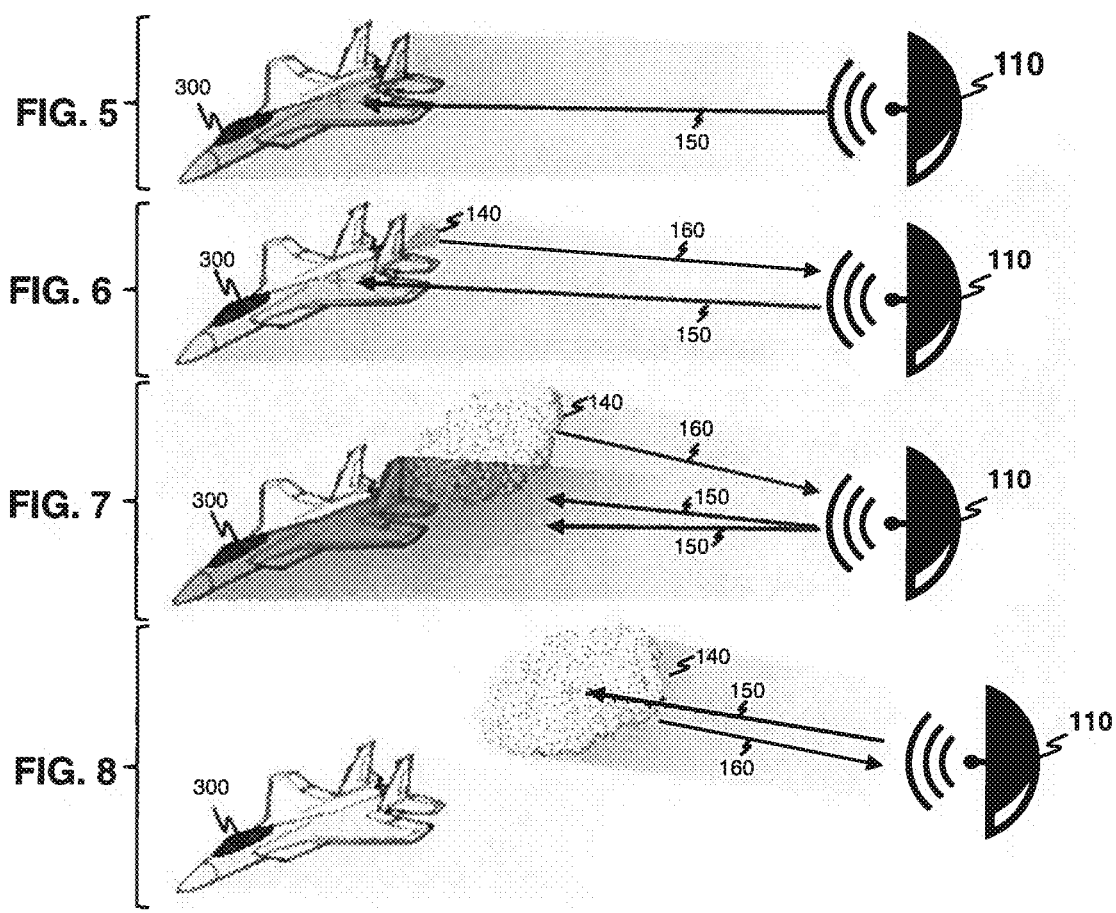

ACTIVE CHAFF

This application is a 371 application of International Application No. PCT/US15/55909, filed Oct. 16, 2015, which claims priority to Provisional Application No. 62/064,974 filed Oct. 16, 2014, which is hereby incorporated herein by reference.

BACKGROUND

The present invention relates generally to electronic counter measures and specifically to electronic countermeasures for protecting mobile platforms against radio frequency threats. Radar systems, typically use electromagnetic waves to identify characteristics, such as range, altitude, direction, and/or speed, of moving objects, such as aircrafts and ships. Such radar systems may support surface-to-air missiles ("SAM") and anti-aircraft armament ("AAA"). Radar system antennae typically transmit pulses of radio waves or microwaves. A portion of these pulsed waves can be reflected from objects that are in the wave's path (or sidelobes of the radar's antenna), and returned to the antenna, wherein the associated radar system detects and measures the reflected waves. Using the time it takes for the reflected waves to return to the antenna and additional signal processing techniques, a radar system computer can calculate how far away the object is, its radial velocity and other characteristics. Transmitters and receivers for such systems can be separate entities ("bistatic") or may exist as co-located unified systems.

Electronic counter measures ("ECM") may include electrical devices that can be designed to nullify or reduce the effectiveness of radar systems. ECMs may be deployed defensively and/or offensively to deny and/or reduce the ability to generate targeting, tracking, identification, and/or positioning information. One form of radar countermeasures is the use of chaff. Chaff may be dispersed as clouds of resonant dipoles into the atmosphere to create a high radar return zone to mask the presence and/or location of an object. Chaff is typically a passive ECM that can be comprised of shredded aluminum foil and/or a glass substrate coated with aluminum. Chaff can have an average overall diameter of around 25 microns. Chaff can be deployed offensively and/or defensively.

Chaff can be employed as a "decoy" or to disrupt the tracking radar lock-on function of, for example, a fire control anti-aircraft armament or missile system. The individual aluminized glass fibers can form electromagnetic dipoles. Effectively, chaff are passive reradiating antennae. The principles on which radar impairment is based are similar whether the radar system is monostatic or bistatic. The main idea is to cause a relatively large amount of energy, dispersed in both angle and range, to be reflected to the receiver with energetic energy sufficient to dominate (i.e. mask) the return signal from the object (i.e. the signal related to object scattering).

BRIEF DESCRIPTION OF THE DRAWINGS

FIG. 5 illustrates a S11 return loss involved in the radio counter measure scheme, in accordance with an embodiment of the present invention.

FIG. 6 illustrates an additional step involved in the radio counter measure scheme, in accordance with an embodiment of the present invention.

FIG. 7 illustrates an additional step in the radio counter measure scheme, in accordance with an embodiment of the present invention.

FIG. 8 illustrates an additonal step in the radio counter measure scheme, in accordance with an embodiment of the present invention.

DETAILED DESCRIPTION

Figure 1:
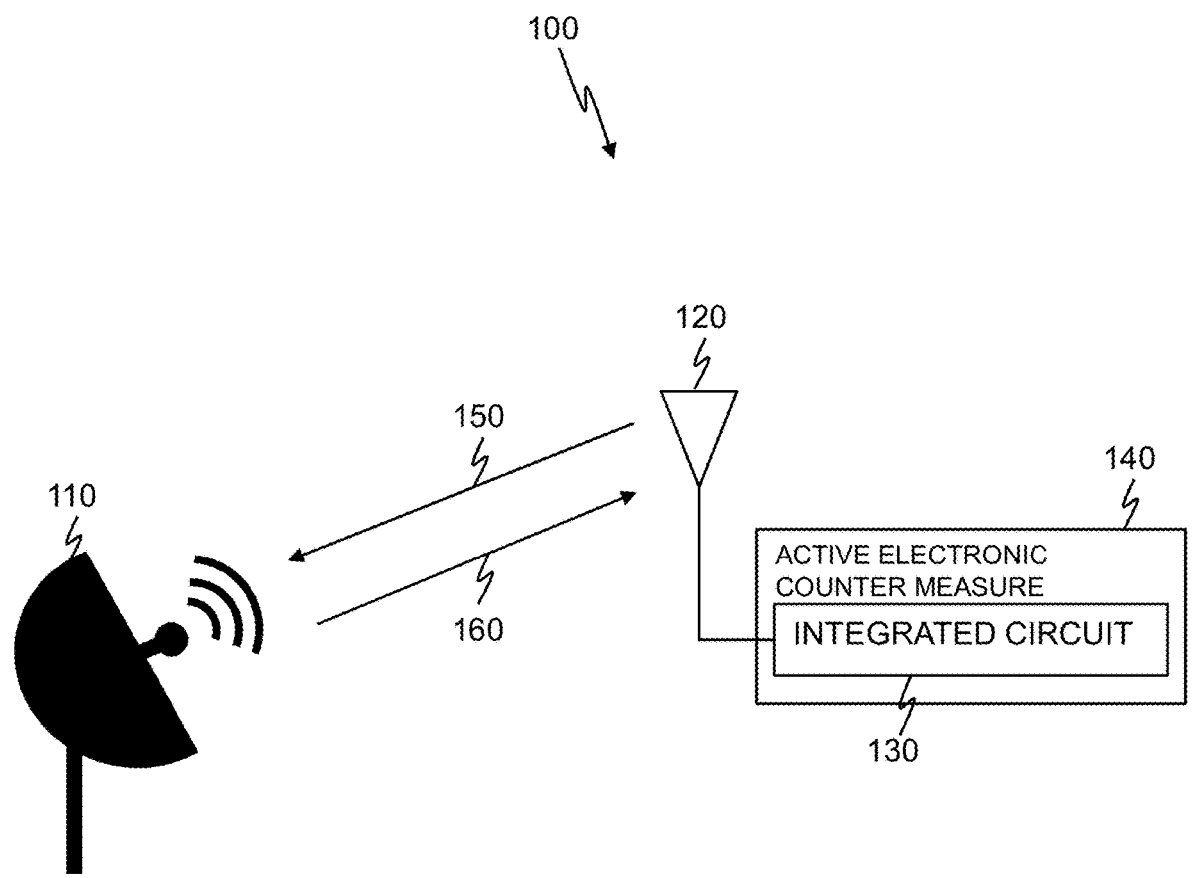
FIG. 1 depicts a radio counter measure environment, in accordance with an embodiment of the present invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. As used herein, the phrases "radio frequency energy" and "radio frequency signals" are used interchangeably.

Radar systems, which may be associated with surface-to-air missiles ("SAM") and anti-aircraft armament ("AAA"), can use electromagnetic waves to identify and/or track characteristics of mobile objects, such as range, altitude, direction, and/or speed. Applicable mobile objects include, for example, aerial and aquatic platforms. Radar system antennae typically transmit pulses of radio waves or microwaves. A portion of these pulsed waves can be reflected from the surface objects that are in the wave's path, and returned to the antenna, wherein the associated radar system detects and measures the direction of the reflected waves in azimuth and elevation. Using the time it takes for the reflected waves to return to the antenna, a radar system computer can calculate how far away the object is, its radial velocity and other characteristics. Transmitters and receivers for radar systems can be separate components or may exist as unified systems.

Electronic counter measures ("ECM") can include electrical devices that are designed to nullify or reduce the effectiveness of radar systems. ECMs may be deployed defensively and/or offensively to deny and/or reduce the ability to generate targeting information. One form of radar countermeasures is the use of chaff. Chaff is a passive ECM that is typically made of shredded aluminum foil and/or a glass substrate coated with aluminum. Chaff may be deployed as clouds of dipoles into the atmosphere to create a high radar return zone to mask the presence of true targets, such as mobile platform 300 (discussed below).

Chaff may also be deployed as a "decoy" or to disrupt the tracking radar lock-on function of, for example, fire control anti-aircraft armament or missile systems. Individual aluminized glass fibers can form electromagnetic dipoles that effectively act as passively reradiating antennae. The principles on which radar impairment is based are similar whether the radar system is monostatic or bistatic. The main idea is to cause a relatively large amount of energy, dispersed in both angle and range, to be reflected to the receiver with energetic energy sufficient to dominate (i.e. mask) the return signal from the target (i.e. the signal related to target scattering).

Embodiments of the present invention seek to provide electrical devices that protect mobile platforms, such as aerial and sea-based mobile platforms, against radio frequency ("RF") threats. Other embodiments of the present invention seek to provide redirective active electronic countermeasures ("AECMs"). Additional embodiments of the present invention seek to provide AECMs that are comprised of printed components. Other aspects of the present invention seek to provide AECMs that reflect RF at a higher amplitude than received. Still other embodiments of the present invention seek to provide AECMs that having a finite life span. Additional embodiments seek to provide AECMs having electromagnetic wave scattering properties. Certain embodiments of the present invention seek to provide AECMs that transmit RF in a manner that compromises a radar system's resolution cells, in range and angle; Doppler sidelobes; and/or saturates the radar's processors.

FIG. 1 depicts a RF counter measure environment ("RFCME"), generally 100, in accordance with an embodiment of the present invention. RFCME environment 100 can include antenna 110 and active electronic counter measure ("AECM") 140. Antenna 110 is a radar antenna, such as a terrestrial, aerial, or aquatic platform. Antenna 110 can be stationary or included on a mobile platform. In an embodiment, antenna 110 is in communication with one or more SAM and/or AAA radar systems. AECM 140 is a radio-based electronic countermeasure having electromagnetic wave scattering properties, in accordance with an embodiment of the present invention. AECM 140 AECM 140 comprises integrated circuit ("IC") 130 and antenna 120. AECM 140 can reflect RF in a manner that increases the radar cross section of the device. AECM 140 may be included in a mobile platform (discussed below). AECM 140 can have a shape that is rectangular, multiangular, trapezoidal, round, or oblong. In certain embodiments, AECM 140 can have a shape that supports an atmospheric dwell time of about 1 minute to about 5 minutes.

IC 130 can be an IC configured with a processing unit that modulates RF signals. Antenna 120 is an electrical device that converts electric power into radio waves and vice versa. Antenna 120 can be a dipole antenna. Antenna 120 can be a broadband antenna. Antenna 120 may be printed on to the surface of a substrate using an electrically conductive composition ("the composition"). The composition can include graphene, graphite, and/or conductive polymers. Applicable graphene can include graphene sheets. The graphene, composition, print substrates, and/or associated printing methods can be derived and/or accomplished utilizing a variety of methods, including, but not limited to, methods disclosed by, for example, U.S. Pat. No. 7,658,901 B2 by Prud'Homme et al, United States patent application 2011/0189452 A1 by Lettow et al., McAllister et al. (*Chem. Mater.* 2007, 19, 4396-4404), United States patent application 2014/0050903 A1 by Lettow et al., and U.S. Pat. No. 8,278,757 B2 by Crain et al, which are hereby incorporated by reference in their entirety. AECM 140

In addition to the substrates disclosed in the aforementioned references, applicable substrates can include substrates that disintegrate in about 1 minutes to about 5 minutes, about 5 minutes to about 10 minutes, about 10 minutes to about 15 minutes, about 15 minutes to about 20 minutes, about 20 minutes to about 25 minutes, or about 25 minutes to about 30 minutes upon deployment, reaching a predetermined altitude, and/or exposure to air. Applicable substrates can be biodegradable. AECM 140 can comprise a substrate to which IC 130 and/or antenna 120 is applied and/or affixed. In certain embodiments, in response to a RF signal, such as carrier signal 160, passing through antenna 120, an AC voltage is generated across antenna 120, which is rectified to result in DC voltage for the operation of IC 130. IC 130 can operate similar to an active or passive RFID tag IC.

IC 130 can become functional as a result of the DC voltage reaching a predetermined level at which time AECM 140, via antenna 120, reflects the RF signal (i.e. backscattering signal 150) in a near omnidirectional pattern, at least a portion of which is received by antenna 110. AECM 140 can, via antenna 120, transmit backscattering signal 150 at a higher amplitude compared to that of carrier signal 160. For example, to achieve backscattering signal 150, IC 130 can modulate the amplitude of carrier signal 160. Alternatively, IC 130 can comprise an internal power source, such as a battery, to power the modulating function. In embodiments wherein IC 130 comprises an internal power source, the internal power source increases the gain and/or increases the amplitude of backscattering signal 150. Antenna 120 can have a length that is about ¼ to about ½, about ½ to about ¾, or about a multiple of carrier signal 160.

The resonant frequency of a dipole antenna, such as antenna 120, can be determined by its length. For example, the length of antenna 120 can be optimized for narrow band (specific radar threats) or changing the length to diameter ratio enabling larger bandwidth-frequency response to threat radar. The length of antenna 120 can be determined by equation [1].

$$l = 468/f_{MHz} \qquad [1]$$

wherein l is the dipole length in feet and $f_{MHz}$ is the frequency in megahertz (MHz), which equals approximately the resonant half-wavelength of carrier signal 150. For example, a cloud of AECM 140 requires the length of antenna 120 to be selected to provide dipole resonance that correspond to at least about the radar wavelength (i.e. carrier signal 150), and corresponding frequency, and for possible radar operation at adjacent frequencies in the radar band. In certain embodiments, the dipoles in an AECM 140 cloud can provide the broadband frequency coverage indicated by carrier signal 160. For example, the broadband frequency coverage can be accomplished using dipoles of different lengths.

Antenna 120 can have a length that is about ¼ to about ½, about ½ to about ¾, or about a multiple of carrier signal 160. AECM 140 can be stored in an oxygen free enclosure. AECM 140 can be stored in an enclosure, such as a chaff launch tube. AECM 140 can function in a similar manner as chaff. Clouds of activated AECM 140 can act as decoys that mimic particular mobile platforms. Clouds of activated AECM 140 can confuse the aggressor missile threat by providing multiple false targets. Applicable shapes for AECM 140 can include, but are not limited to square trihedral corner retro-reflector, right dihedral corner reflector, flat plate, cylinder, sphere, straight edge normal incidence, curved edge normal incidence, apex, discontinuity of curvature along a straight line normal incidence, discontinuity of curvature of a curved edge, and discontinuity of curvature along an edge.

The activated AECM 140 cloud can disrupt the tracking radar lock-on function of, for example, fire control anti-aircraft armaments or missile systems that are associated with antenna 110. AECM 140 can transmit backscattering signal 160 to antenna 110 with an amplitude sufficient to dominate or mask energy due to target scattering. AECM 140 clouds can comprise randomly oriented copies of AECM 140 that contribute to the total radar cross section of the cloud. AECM 140 can transmit backscattering signal 160 in a continuous or discontinuous manner, for example, in a repeating manner. AECM 140 can transmit backscattering signal 160 in a delayed manner subsequent to activation, for example, to simulate different ranges.

Antennas 120 can operate in one or more (multi-octave) North Atlantic Treaty Organization ("NATO") frequency bands, such as A, B, C, D, E, F, G, H, I, J, K, L and M. In an embodiment, one or more copies of AECM 140 having differing operational frequencies are used to cover a plurality of bandwidths. Backscattering signal 160 can correspond to at least a portion of bandwidth 150.

Figure 2:
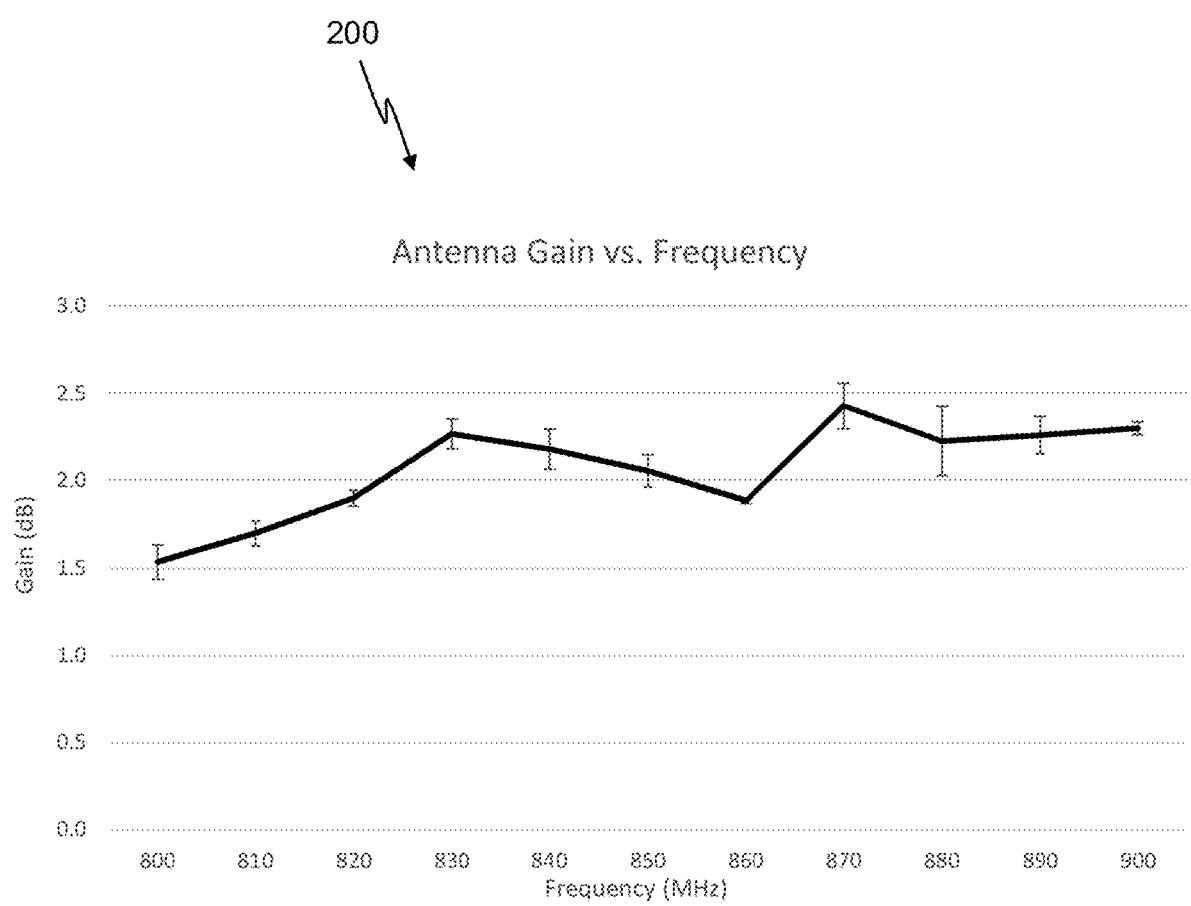
FIG. 2 illustrates a return loss trace, in accordance with an embodiment of the present invention.
Figure 3:
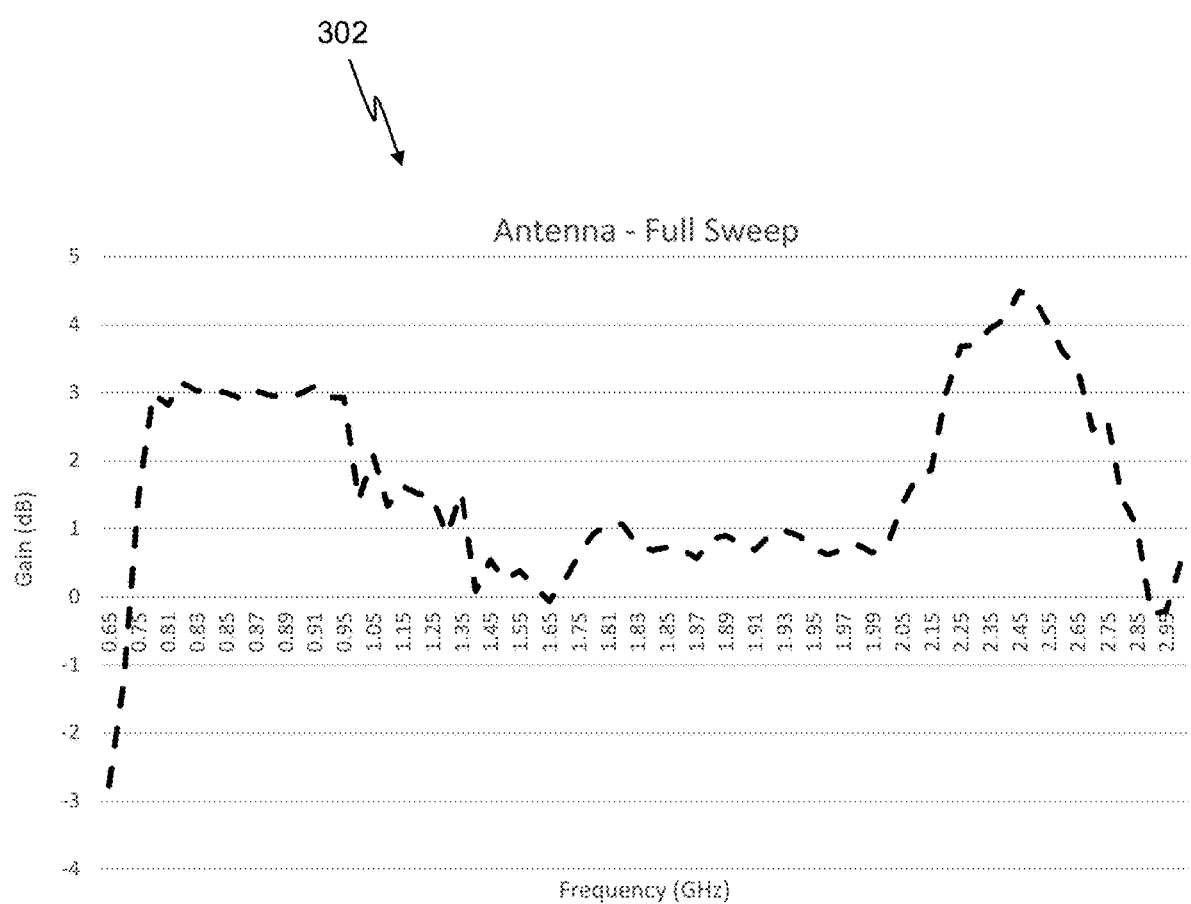
FIG. 3 illustrates a gain versus frequency plot of an antenna involved in a radio counter measure scheme, in accordance with an embodiment of the present invention.
Figure 4:
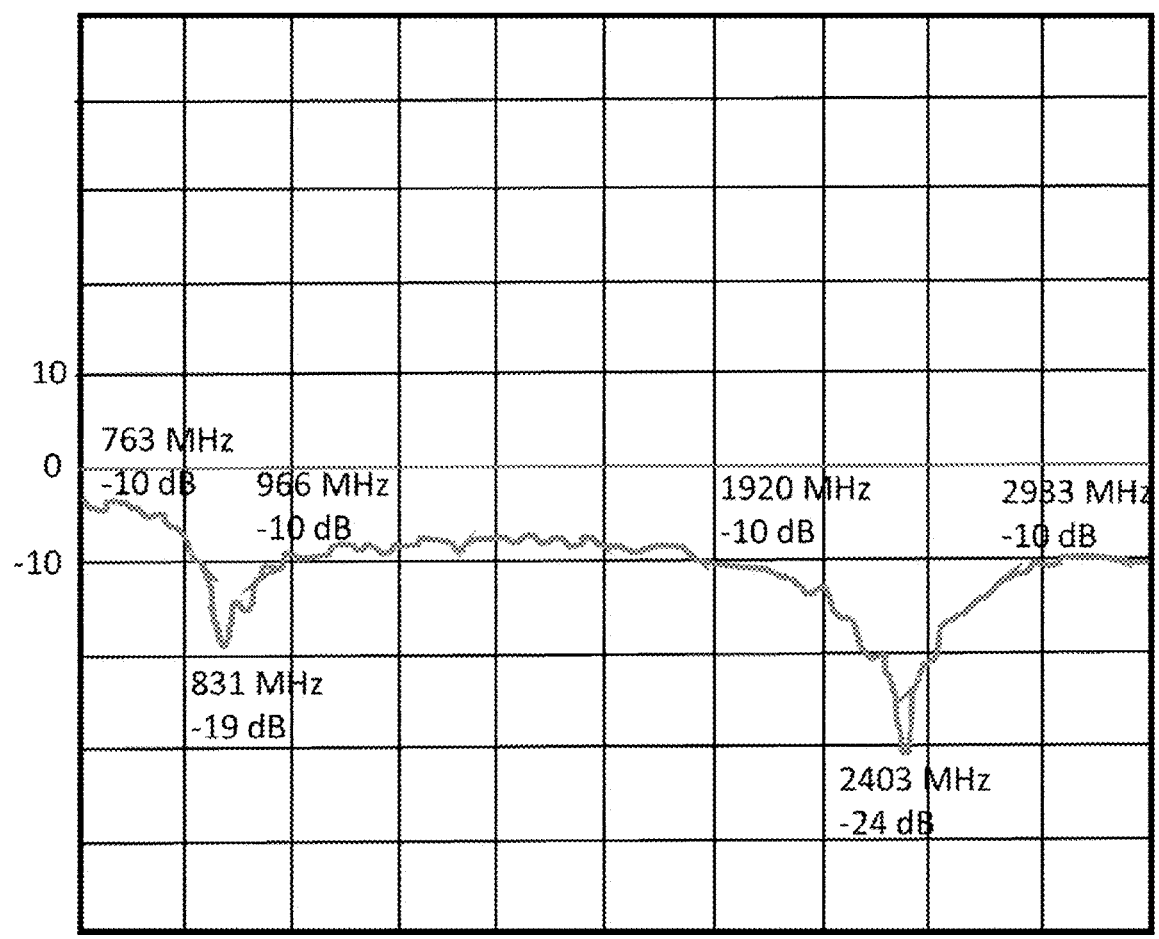
FIG. 4 illustrates return loss plot of the antenna involved in the radio counter measure scheme, in accordance with an embodiment of the present invention.

FIGS. 2-4 illustrate data for an antenna, for example, antenna 120, in accordance with an embodiment of the present invention. FIG. 2 illustrates a gain versus frequency plot, generally 200, in accordance with an embodiment of the present invention. Plot 200 depicts an antenna gain versus frequency plot, wherein measurements were taken while the antenna transmitted at frequencies corresponding to 800 MHz to 900 MHz. FIG. 3 illustrates an antenna gain versus frequency plot, generally 302, in accordance with an embodiment of the present invention. Plot 302 depicts an antenna gain versus frequency plot, wherein the measurements were taken while the antenna transmitted at frequencies corresponding to 650 MHz to 3000 MHz. FIG. 4 illustrates an antenna return loss plot, in accordance with an embodiment of the present invention. Specifically, FIG. 4 illustrates the S11 return loss for the antenna. Combined, FIGS. 2-4 demonstrate that antennas of the present invention are capable of exhibiting broadband characteristics with high gain at 650 MHz to 3000 MHz, a relatively good match, and a return loss at or below about −10 dB.

FIGS. 5-8 are presented herein to facilitate the discussion of the operation of AECM 140, in accordance with an embodiment of the present invention. Antenna 110 transmits carrier signal 150 a portion of which irradiates mobile platform 300, depicted here as an aircraft, as reflected in FIG. 5. For example, antenna 110 is associated with a radar having hostile, identification, and/or tracking intent towards mobile platform 300, such as a radar system for a surface-to-air-missile or an anti-aircraft artillery system. In response to detecting carrier signal 150, mobile platform 300 deploys multiple copies of AECM 140 in an expanding cloud, as reflected in FIG. 6. Subsequently, the AECM 140 cloud is activated by carrier signal 150.

The cloud of AECM 140 can expand in diameter upon dispersion through the air, which can thereby increases the radio cross section of the cloud. The AECM 140 cloud can be a diffuse object with a Gaussian distribution of dipole concentrations, wherein the separation of dipoles varies. For example, the central core, middle region, and diffuse regions can have a separation of 0.5, 1, and 4 meters, respectively. The cloud transmits backscattering signal 160 in a near (or quasi) omnidirectional manner one of which is in line with antenna 110, as depicted in FIG. 7. The strength of backscattering signal 160 and the overall radio cross section of the cloud can result in the focus of the radar system associated with antenna 110 transferring to the cloud instead of mobile platform 300, as depicted in FIG. 8.

What is claimed is:

1. A chaff electronic countermeasure device comprising:
   an antenna element in communication with a substrate;
   an integrated circuit in electrical communication with the antenna element;
   wherein the device is configured to absorb from a radar source a first radio frequency having a first amplitude;
   wherein, in response to absorbing the first radio frequency, the device is configured to reradiate at least a portion of a second radio frequency having a second amplitude toward the radar source, thereby resulting in an increased radar cross section of the device as perceived by the radar source; and
   wherein the second amplitude is higher than the first amplitude.

2. The chaff electronic countermeasure device of claim 1, wherein the radio frequency band is one or more multi-octave of A, B, C, D, E, F, G, H, I, J, K, L and M North Atlantic Treaty Organization frequency bands.

3. The chaff electronic countermeasure device of claim 1, wherein the device has an atmospheric dwell time of up to 5 minutes.

4. The chaff electronic countermeasure device of claim 1, wherein the antenna element is printed on the substrate.

5. The chaff electronic countermeasure device claim 4, wherein substrate is biodegradable.

6. The chaff electronic countermeasure device of claim 4, wherein the substrate has a lifespan of about 10 minutes to about 15 minutes upon exposure to air and/or altitude dependent.

7. The chaff electronic countermeasure device of claim 1, wherein the device is configured to be stored in a vacuum sealed container.

8. The chaff electronic countermeasure device of claim 1, wherein the device is configured to be dispersed aerially from a mobile device.

9. The chaff electronic countermeasure device of claim 1, wherein the device has a length that is about ¼ to about 1 about ½ to about ¾, or about a multiple of the first radio frequency wavelength.

10. The chaff electronic countermeasure device of claim 1, wherein the radar source is a radar antenna.

11. The chaff electronic countermeasure device of claim 1, wherein the antenna element comprises graphene sheets.

12. The chaff electronic countermeasure device of claim 1, wherein the computing device comprises a power source.

13. The chaff electronic countermeasure device of claim 1, wherein the substrate disintegrates in about 1 minutes to about 5 minutes, about 5 minutes to about 10 minutes, about 10 minutes to about 15 minutes, about 15 minutes to about 20 minutes, about 20 minutes to about 25 minutes, or about 25 minutes to about 30 minutes upon deployment, reaching a predetermined altitude, and/or exposure to air.

14. The chaff electronic countermeasure device of claim 1, wherein the antenna element is a dipole antenna.

15. The chaff electronic countermeasure device of claim 1, wherein the antenna element is a broadband dipole antenna.

16. The chaff electronic countermeasure device of claim 1, wherein the second radio frequency corresponds to at least a portion of the first radio frequency.

17. The chaff electronic countermeasure device of claim 1, wherein the chaff electronic countermeasure device is deployed from an aerial platform or a sea-based platform, and wherein the second radio frequency corresponds to a radio frequency signature that is not associated with the aerial platform or the sea-based platform.

18. A radio-based electronic countermeasure method, comprising:
- detecting a carrier signal having hostile, identification, and/or tracking intent towards a mobile platform;
- deploying, from the mobile platform, a plurality of the chaff electronic countermeasure devices of claim 1;
- wherein the plurality of the chaff electronic countermeasure devices are activated by the carrier signal; and
- wherein the activated chaff electronic countermeasure devices emit a backscattering signal that masks the location, identification, and/or trajectory of the mobile platform a source of the carrier signal.

\* \* \* \* \*